(12) United States Patent
Li

(10) Patent No.: US 10,816,416 B2
(45) Date of Patent: Oct. 27, 2020

(54) PRESSURE SENSOR, ELECTRONIC DEVICE, AND METHOD FOR MANUFACTURING PRESSURE SENSOR

(71) Applicant: SHENZHEN NEW DEGREE TECHNOLOGY CO., LTD., Shenzhen, Guangdong (CN)

(72) Inventor: Hao Li, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 38 days.

(21) Appl. No.: 16/075,869

(22) PCT Filed: Feb. 6, 2016

(86) PCT No.: PCT/CN2016/073727
§ 371 (c)(1),
(2) Date: Aug. 6, 2018

(87) PCT Pub. No.: WO2017/133017
PCT Pub. Date: Aug. 10, 2017

(65) Prior Publication Data
US 2019/0041281 A1     Feb. 7, 2019

(51) Int. Cl.
*G01L 1/18*     (2006.01)
*G06F 3/041*    (2006.01)
*G06F 3/045*    (2006.01)
*G01L 1/22*     (2006.01)
(Continued)

(52) U.S. Cl.
CPC ............ *G01L 1/18* (2013.01); *G01L 1/225* (2013.01); *G01L 9/04* (2013.01); *G06F 3/041* (2013.01);
(Continued)

(58) Field of Classification Search
CPC ... G01L 1/18; G01L 1/225; G01L 9/04; G01L 9/06; G06F 3/041; G06F 3/045; G06F 2203/04105
(Continued)

(56) References Cited

U.S. PATENT DOCUMENTS 6,225,576 B1 * 5/2001 Poole ............... G01G 3/1412
                                                              177/211
6,649,988 B2    11/2003 Toyoda et al.
(Continued)

FOREIGN PATENT DOCUMENTS

CN     101490642     7/2009
CN     103154867     6/2013
(Continued)

OTHER PUBLICATIONS

International Search Report for PCT/CN2016/073727 dated Oct. 27, 2016, 6 pages.

*Primary Examiner* — Max H Noori
(74) *Attorney, Agent, or Firm* — Nixon & Vanderhye PC

(57) ABSTRACT

In the pressure sensor, at least two resistors are simultaneously molded at the first mounting surface and the second mounting surface of the substrate component ensuring uniformity and consistency of resistance of all resistors, at least one of resistors is a strain sensing resistor, and the resistors are electrically connected to form a pressure measuring circuit. Connecting the pressure sensor to the desired panel to accurately detect the curved deformation amount of the panel. The resistors in a pressure measuring circuit are adjacently distributed, and the resistance value of the resistor changes with temperature at the same time, so that the influence of the temperature change on the pressure measuring circuit is very small, and the interference against the external environment is good.

20 Claims, 7 Drawing Sheets

(51) Int. Cl.
*G01L 9/04* (2006.01)
*G01L 9/06* (2006.01)

(52) U.S. Cl.
CPC .............. *G06F 3/045* (2013.01); *G01L 9/06* (2013.01); *G06F 2203/04105* (2013.01)

(58) Field of Classification Search
USPC .......................................................... 73/777
See application file for complete search history.

(56) References Cited

U.S. PATENT DOCUMENTS

| | | | | |
|---|---|---|---|---|
| 6,993,982 | B2* | 2/2006 | Karasawa | G01L 5/161 |
| | | | | 73/862.629 |
| 7,260,996 | B2 | 8/2007 | Cheng | |
| 7,712,373 | B2* | 5/2010 | Nagle | A61B 5/1135 |
| | | | | 73/780 |
| 2006/0232636 | A1* | 10/2006 | Bengali | B41J 2/14145 |
| | | | | 347/65 |
| 2006/0250534 | A1* | 11/2006 | Kutscher | H03K 17/964 |
| | | | | 349/41 |
| 2007/0137306 | A1* | 6/2007 | Cheng | G01L 1/2206 |
| | | | | 73/754 |
| 2008/0011095 | A1* | 1/2008 | Bloom | G01L 1/20 |
| | | | | 73/819 |
| 2012/0086659 | A1* | 4/2012 | Perlin | G06F 3/0304 |
| | | | | 345/173 |
| 2018/0072569 | A1* | 3/2018 | Berggren | B81C 1/00865 |
| 2018/0172531 | A1* | 6/2018 | Nishiyama | H01L 24/00 |
| 2019/0094007 | A1* | 3/2019 | Li | G01B 7/293 |

FOREIGN PATENT DOCUMENTS

| | | |
|---|---|---|
| CN | 103162873 | 6/2013 |
| CN | 103837288 | 6/2014 |
| CN | 204964077 | 1/2016 |

\* cited by examiner 11　　　　　　　　　　　　12

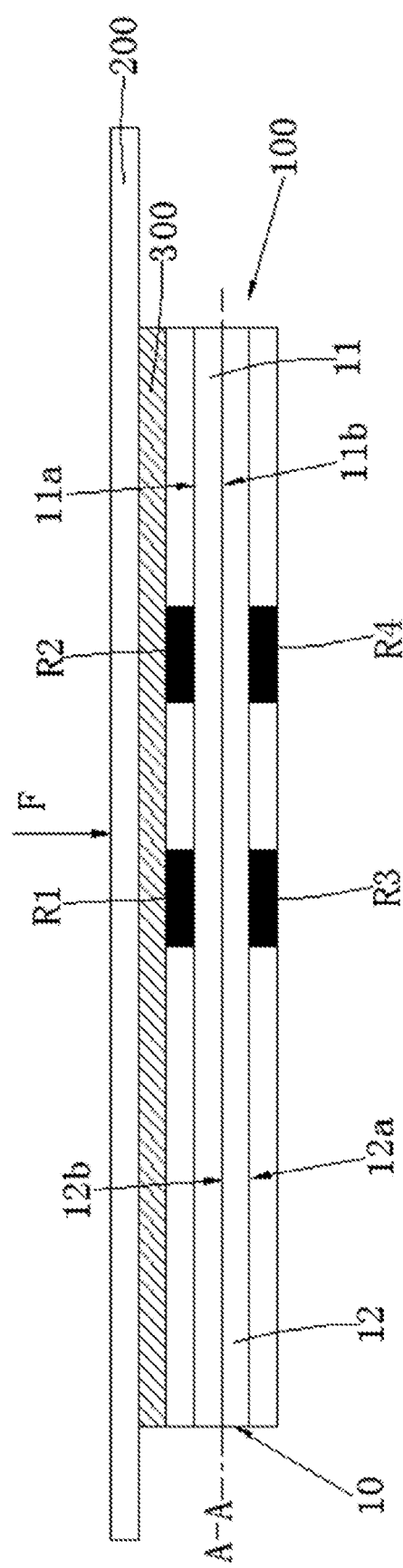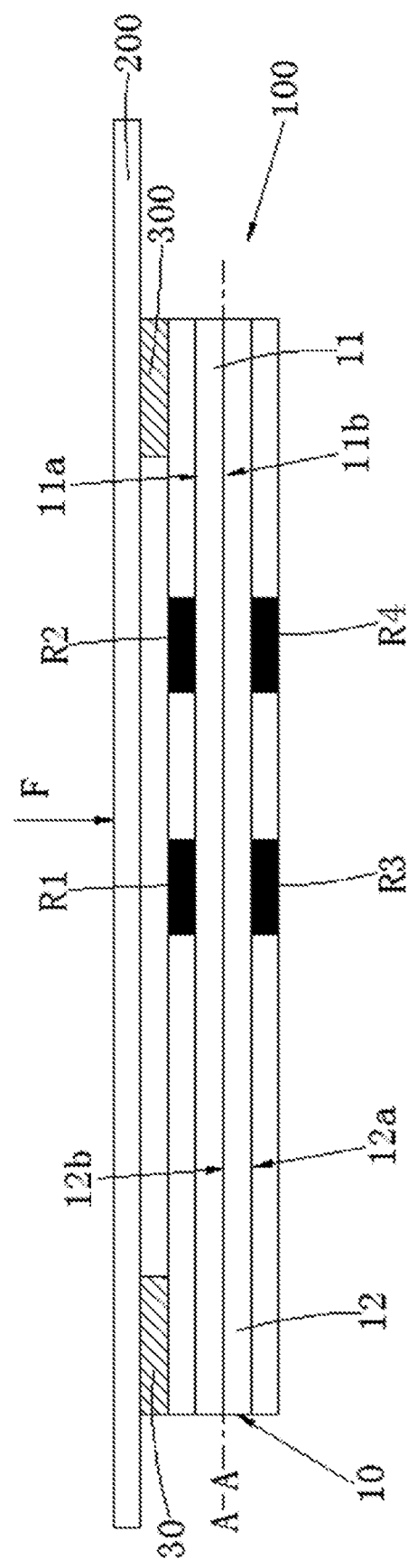

US 10,816,416 B2

PRESSURE SENSOR, ELECTRONIC DEVICE, AND METHOD FOR MANUFACTURING PRESSURE SENSOR

This application is the U.S. national phase of International Application No. PCT/CN2016/073727 filed Feb. 6, 2016, which designated the U.S., the entire contents of which are hereby incorporated by reference.

TECHNICAL FIELD

The present application relates to the technical field of pressure sensing, and more particularly to a pressure sensor, electronic device and a method for manufacturing the pressure sensor.

BACKGROUND

In the industry today, there are already exist some pressure sensors, such as resistance strain gauge type, capacitive sensing type, and piezoelectric ceramic type. These pressure sensors are formed by complex circuit design and structural design to form the pressure sensor itself. For example, the resistance strain gauge type needs to select strain gauges that meet the requirements of resistance and deviation in a plurality of produced strain gauges, combining the strain gauges into a certain circuit structure, and connecting to the sensing structure by the adhesive. The strain gauge has a low pressure deformation, so the sensing structure needs to be accurately positioned and carefully bonded. While the capacitive sensing type needs to strictly control the distance of each capacitor point from the panel, and obtains pressure information by changing the distance. This approach requires extremely high machining accuracy and assembly accuracy. While the piezoelectric ceramic type obtains pressure information by instantaneous impact on the piezoelectric ceramic to obtain a short-term voltage change; its manufacture requires uniform piezoelectric ceramic parts, and needs to be installed in a set structure by a special mounting method. This practice has greatly increased the cost of using pressure sensors, which has brought difficulties to the large-scale promotion of pressure sensing. In addition, the existing pressure sensors are difficult to have little different resistance value of all the resistors in one pressure measuring circuit, and it is difficult to ensure the uniformity and consistency of the resistance values of all the resistors, the assembly method requires extremely high, pressure detection accuracy low, and high production costs, took up space in the structure. In particular, these pressure sensors are less resistant to external environmental disturbances, and under temperature variation conditions, the pressure sensors are affected, therefore resulting in inaccurate pressure measurement.

SUMMARY

An objective of the present application is to provide a pressure sensor in order to solve the problem that the existing pressure sensors are difficult to ensure the uniformity and consistency of the resistance of all resistors, less resistant to external environmental disturbances or the pressure measurement is inaccurate when the temperature changes, and took up space in the structure.

The present application is achieved in such a method that a pressure sensor, comprising:

a substrate component, the substrate component has a first mounting surface and a second mounting surface disposed away from each other; and a pressure measuring circuit, the pressure measuring circuits has a simultaneously molded at least two resistors on the substrate component, wherein at least one of the resistors is located on the first mounting surface, the other resistor is located on the second mounting surface, and at least one of the resistors is a strain sensing resistor for detecting a deflection deformation of the substrate component, the resistors in the pressure measuring circuit are adjacently distributed.

Another object of the present application is to provide an electronic device, comprising: a panel, a pressure sensor, and a pressure sensing detection circuit electrically connected to the pressure sensor, the substrate is connected to an inner side of the panel.

Another object of the present application is to provide a method for manufacturing a pressure sensor, comprising the steps:

S11) providing the first substrate and the second substrate;

S12) simultaneously molding at least two resistors by using the same process at the first mounting surface and the second mounting surface, wherein one of the resistor is located on the first mounting surface, and the other resistor is located on the second mounting surface, and at least one of the resistors is a strain sensing resistor for detecting a deflection deformation of the substrate component;

S13) bonding the first bonding surface to the second bonding surface;

S14) electrically connecting the resistors to form a pressure measuring circuit.

Another object of the present application is to provide a method for manufacturing a pressure sensor, comprising the steps:

S21) providing the substrate component;

S22) simultaneously molding at least two resistors by using the same process at the first mounting surface and the second mounting surface to ensure that at least one of the resistors is located on the first mounting surface, and the other resistor is located on the second mounting surface, and at least one of the resistors is a strain sensing resistor for detecting a deflection deformation of the substrate component;

S23) bonding the first bonding surface to the second bonding surface;

S24) electrically connecting the resistors to form a pressure measuring circuit.

Comparing to the prior art, the technical effect of the present application is that at least two resistors are simultaneously molded at the first mounting surface and the second mounting surface ensuring uniformity and consistency of resistance of all resistors, at least one of resistors is a strain sensing resistor, and the resistors are electrically connected to form a pressure measuring circuit. the pressure sensor is connected to the desired panel to accurately detect the curved deformation of the panel.

When the panel is pressed, the panel will generate a deflection deformation, causing the pressure sensor to generate a corresponding deformation. The strain sensing resistor is deformed, causing a change in electrical characteristics, and then the corresponding electrical signal output is obtained through the pressure sensing detection circuit. The resistors in a pressure measuring circuit are adjacently distributed, and the resistance value of the resistor changes with temperature at the same time, so that the influence of the temperature change on the pressure measuring circuit is very small, and the interference against the external environment is good.

The pressure sensor is easy to manufacture and assemble, the process is simple, can realize pressure recognition and detection, the sensitivity is high, and avoiding the requirement that the existing pressure sensor assembly method is extremely high, the pressure detection precision is low, and the manufacture cost is high. The thickness of the pressure sensor can be from 0.08 mm to 3 mm and is suitable for the mobile phone industry where the thickness is currently high.

BRIEF DESCRIPTION OF THE DRAWINGS

FIG. 12 is a schematic structural view of an electronic device according to a first embodiment of the present invention;

FIG. 13 is a schematic structural view of an electronic device according to a second embodiment of the present invention.

Figure 1:
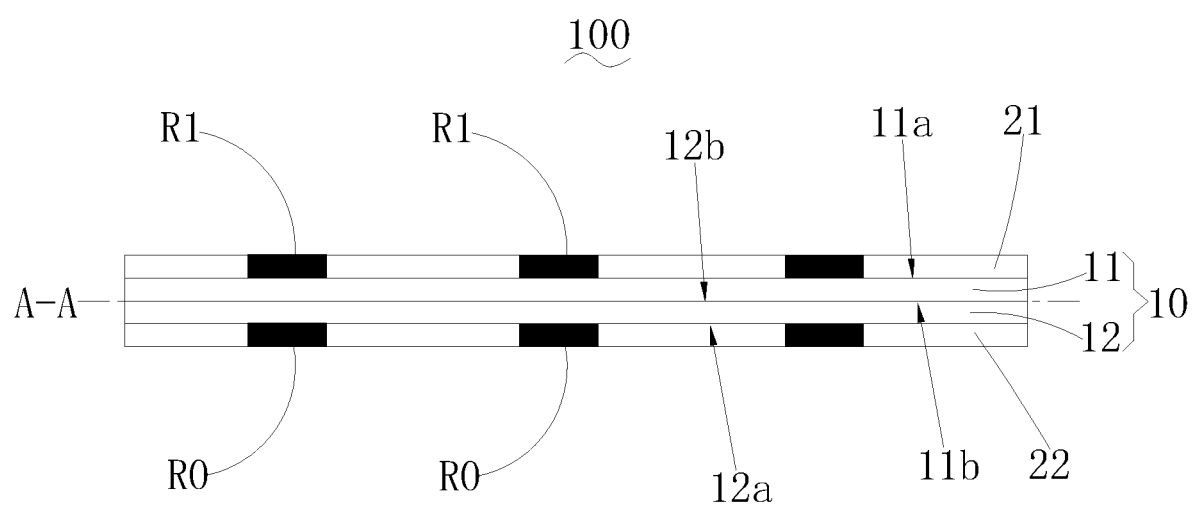
FIG. 1 is a front view of a pressure sensor according to a first embodiment of the present application.
Figure 2:
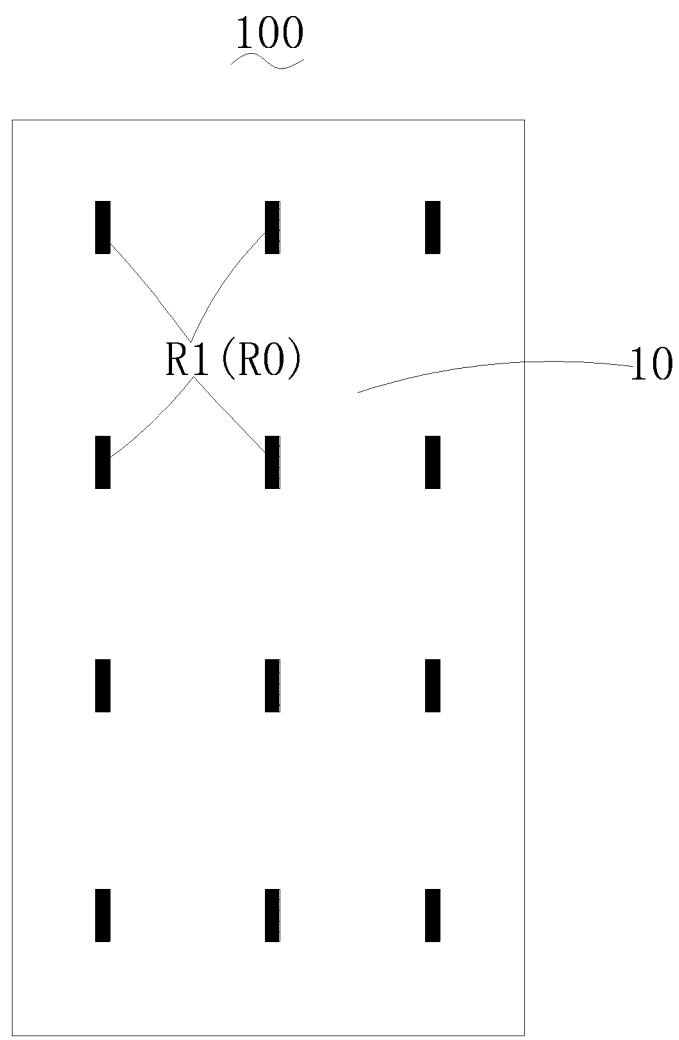
FIG. 2 is a top view of the pressure sensor of FIG. 1.

In the drawings, the following reference numerals are used:
pressure sensor 100, substrate component 10, first substrate 11, first mounting surface 11a, first bonding surface 11b, second substrate 12, second mounting surface 12a, second bonding surface 12b, first sensor layer 21, second sensor layer 22, panel 200, adhesive 300, reference resistor R0, strain sensing resistors R1, R2, R3, R4.

DETAILED DESCRIPTION OF THE EMBODIMENTS

In order to make the purpose, technical solutions, and beneficial effects of the present application clearer and more understandable, the present application will be further described in detail herein after with reference to the accompanying drawings and embodiments. It should be understood that the embodiments described herein are only intended to illustrate but not to limit the present application.

Please refer to FIGS. 1 to 4, and FIG. 12, a pressure sensor 100 according to a first embodiment of the present application, comprising:

a substrate component 10, the substrate component 10 has a first mounting surface 11a and a second mounting surface 12a disposed away from each other; and a pressure measuring circuit, the pressure measuring circuits has a simultaneously molded at least two resistors on the substrate component 10, wherein at least one of the resistors is located on the first mounting surface 11a, the other resistor is located on the second mounting surface 12a, and at least one of the resistors is a strain sensing resistor for detecting a deflection deformation of the substrate component 10, the resistors in the pressure measuring circuit are adjacently distributed.

At least two resistors are simultaneously molded at the first mounting surface 11a and the second mounting surface 12a ensuring uniformity and consistency of resistance of all resistors, at least one of resistors is a strain sensing resistor, and the resistors are electrically connected to form a pressure measuring circuit. Connecting the pressure sensor 100 to the desired panel 200 to accurately detect the curved deformation amount of the panel 200.

When the panel 200 is pressed, the panel 200 will generate a deflection deformation, causing the pressure sensor 100 to generate a corresponding deformation. The strain sensing resistor R1 is deformed, causing a change in electrical characteristics, and then the corresponding electrical signal output is obtained through the pressure sensing detection circuit. The resistors in a pressure measuring circuit are adjacently distributed, and the resistance value of the resistor changes with temperature at the same time, so that the influence of the temperature change on the pressure measuring circuit is very small, and the interference against the external environment is good.

The pressure sensor 100 is easy to manufacture and assemble, the process is simple, can realize pressure recognition and detection, the sensitivity is high, and avoiding the requirement that the existing pressure sensor assembly method is extremely high, the pressure detection precision is low, and the manufacture cost is high. The thickness of the pressure sensor can be from 0.08 mm to 3 mm and is suitable for the mobile phone industry where the thickness is currently high.

The strain sensing resistor can be a deformation sensitive resistor, a varistor, a strain gauge, a FSR resistive pressure sensor, or other strain sensing resistor.

Further, the substrate component 10 includes a first substrate 11 and a second substrate 12, the first mounting surface 11a is a side surface of the first substrate 11, and the first substrate 11 has a first bonding surface 11b facing away from the first mounting surface 11a. the second mounting surface 12a is a side surface of the second substrate 12, and the second substrate 12 has a second bonding surface 12b facing away from the second mounting surface 12a, the first bonding surface 11b and the second bonding surface 12b are attached to each other. At least one resistor is simultaneously molded on the first mounting surface 11a, while another resistor molded on the second mounting surface 12a by the same process, which ensuring uniformity and consistency of resistance of all the resistors, and then the first mounting surface 11a is attached to the second mounting surface 12a, and the strain sensing resistor R1 (reference resistor R0) on both sides of the front and back are coincident or have a certain misalignment position. The scheme is easy to manufacture and assemble.

Further, a first sensor layer 21 is disposed on the first mounting surface 11a of the first substrate 11, a resistor or a circuit is disposed in the first sensor layer 21, and a second sensor layer 22 is disposed on the second mounting surface 12a of the second substrate 12, a resistor or circuit is disposed in the second sensor layer 22. The scheme is easy to manufacture.

Further, the number of pressure measuring circuits is at least two, and the pressure measuring circuits are distributed in an array on the substrate component 10. In this scheme, when the pressure is applied to the plurality of positions of the panel 200, the strain sensing resistor R1 follows the deflection deformation of the panel 200 to generate a measurement signal, and the deflection deformation of the panel 200 is measured. The number of bridge circuits can vary depending on the physical size of the panel 200. The position of multiple pressure measurement circuits can be set as needed.

Figure 5:
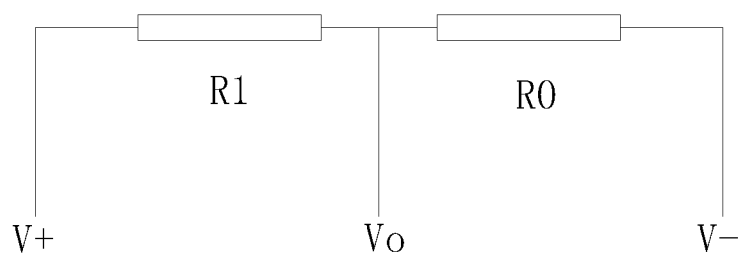
FIG. 5 is a schematic view of a pressure measuring circuit applied to the pressure sensor of FIG. 1.

Further, please refer to FIG. 5 at the same time, a pressure measuring circuit has two resistors, and the pressure measuring circuit is a series circuit formed by a strain sensing resistor R1 and a reference resistor R0 in series.

Using a constant voltage source, inflicting input voltage Ui on both ends of V+ and V−, detect the potential at Vo, or measure the output voltage Uo between Vo and ground, there are input and output voltage formulas:

$$U_o = \frac{R_1}{R_1 + R_0} U_i$$

When the strain sensing resistor R1 is deformed, and its electrical characteristics are changed, and the pressure measuring circuit obtains the output voltage Uo. Through the pressure sensing detection circuit, the corresponding electrical signal output is obtained, and pressure recognition and detection are realized.

It can be understood that a pressure measuring circuit has two resistors, and the pressure measuring circuit is a series circuit formed by connecting two strain sensing resistors in series. The scheme can also obtain the corresponding electrical signal output through the pressure sensing detection circuit to realize pressure identification and detection.

Further, the first substrate 11 comprises a first base board and a first circuit layer disposed on the first base board. The second substrate 12 comprises a second base board and a second circuit layer disposed on the second base board. The circuit layer can implement predetermined circuit functions.

Further, a perforation for disposing an electrical conductor electrically connecting the first circuit layer and the second circuit layer is disposed on the first substrate or the second substrate. The perforation is formed in the first substrate or the second substrate, and the two circuit layers are connected by providing a conductive paste, a silver paste, a conductive printed layer or the like in the perforation.

Further, the first base board is one of a group consisting of a PI film (polyimide film), a PET film (high temperature resistant polyester film) and a glass fiber board. the second base board is one of a group consisting of a PI film (polyimide film), a PET film (high temperature resistant polyester film) and a glass fiber board. The base board can be equipped with a strain sensing resistor. It will be appreciated that the base board may also be other base boards. Further, the circuit layer is disposed on one side or both sides of the base board. All of the above schemes enable the pressure sensor 100 to perform predetermined circuit functions.

Further, the resistor is a print molded resistor, a coated molded resistor, a print molded polymer coating having a pressure-sensitive property, or a sintered molded piezoelectric ceramic coating. All of the above resistors can change the resistance according to the deformation or as a reference resistor. The pressure sensor 100 can be made by printing or coating, and its thickness can be very thin: 0.08 mm-3 mm, which is suitable for the mobile phone industry which currently has a high thickness requirement.

Further, the substrate component 10 is a flexible circuit board or a rigid circuit board. The flexible circuit board or the rigid circuit board has a circuit distribution that implements predetermined circuit functions. When the substrate component 10 is a flexible circuit board, the substrate component 10 is connected to the entire surface of the panel 200; when the substrate component 10 is a rigid circuit board, the substrate component 10 is connected to the entire surface or the periphery of the panel 200. It can be understood that the substrate component 10 can also be other substrates 10 with their own circuits.

Figure 6:
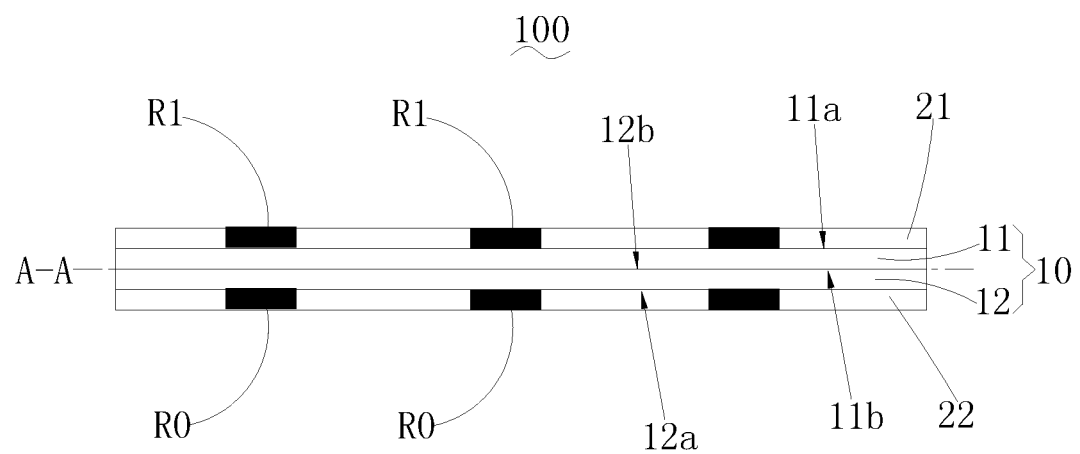
FIG. 6 is a front view of a pressure sensor according to a second embodiment of the present invention.
Figure 7:
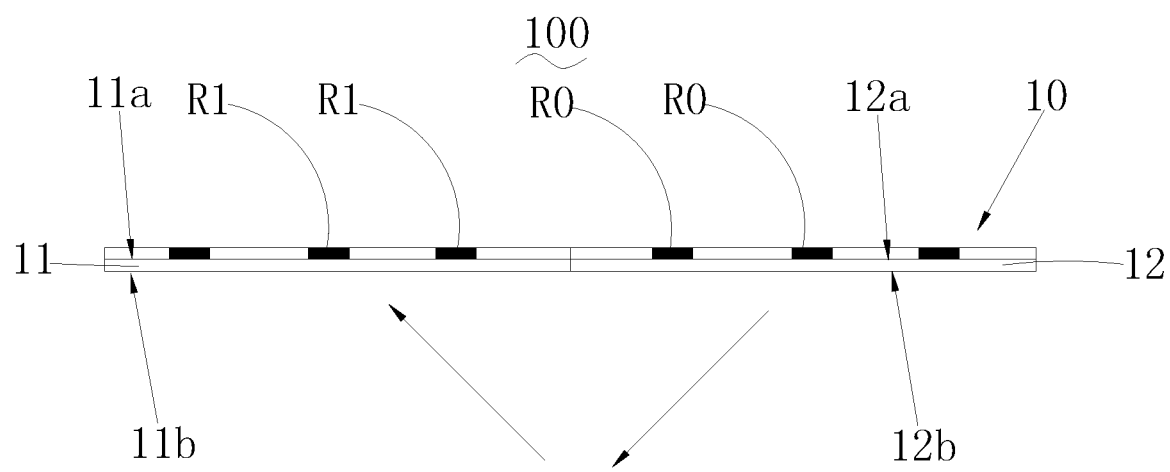
FIG. 7 is a schematic structural view of the pressure sensor of FIG. 6 when the first substrate and the second substrate are unfolded.
Figure 8:
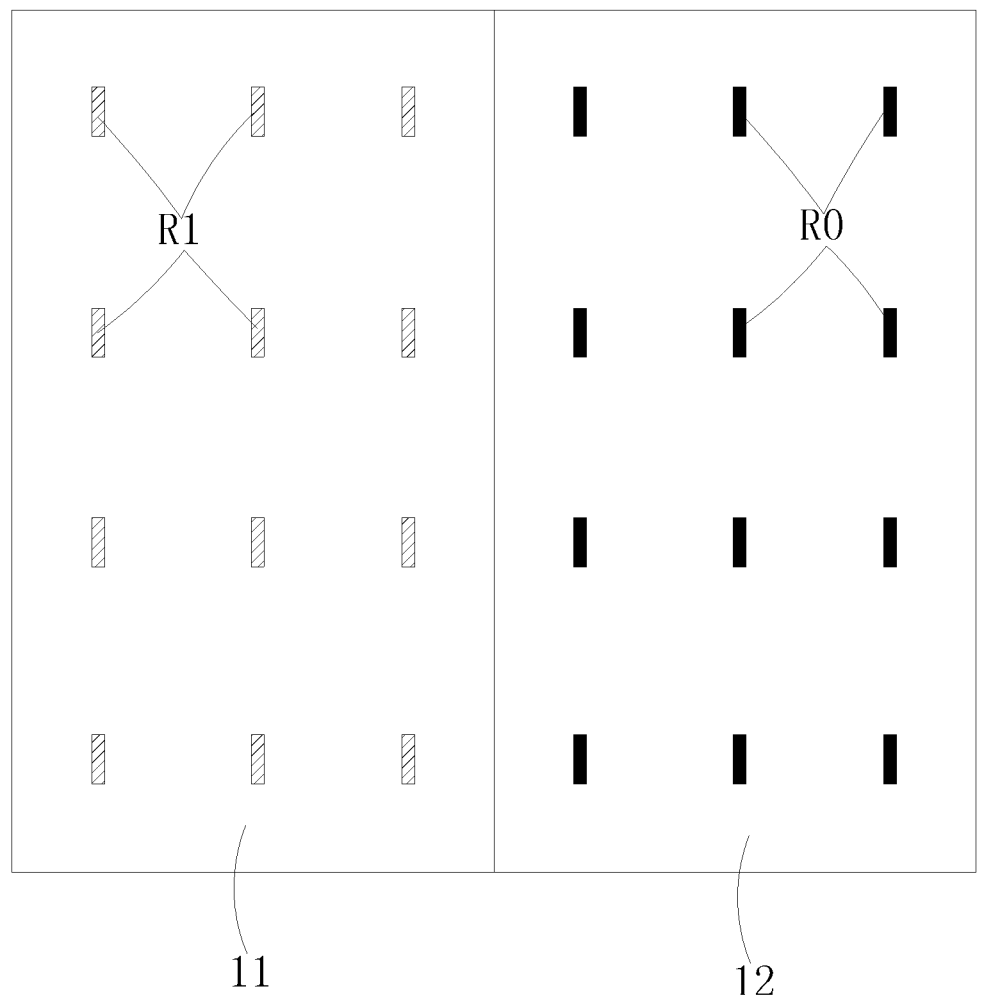
FIG. 8 is a top view of the pressure sensor of FIG. 7.

Please refer to FIGS. 6 to 8, the pressure sensor 100 provided by the second embodiment of the present application is substantially the same as the pressure sensor 100 provided by the first embodiment, unlike the first embodiment, the first substrate 11 and the second substrate 12 are integrally formed, a side of the first substrate 11 is connected to a side of the second substrate 12, and a broken line is formed at the joint of the first substrate 11 and the second substrate 12. At least one resistor is simultaneously molded on the first mounting surface 11a, while another resistor molded on the second mounting surface 12a by the same process, which ensuring uniformity and consistency of resistance of all the resistors, and then folding the along the intermediate broken line to attach the first substrate 11 and the second substrate 12, so that the resistors on the front and back sides of the are coincident or have a certain misalignment position after folding. The scheme is easy to manufacture and assemble.

Further, a circuit disposed between the resistors on both of the second substrate 12 and the first substrate 11 to realize electrical connection, and the scheme is easy to be processed for the circuit located at the position of folding.

Figure 9:
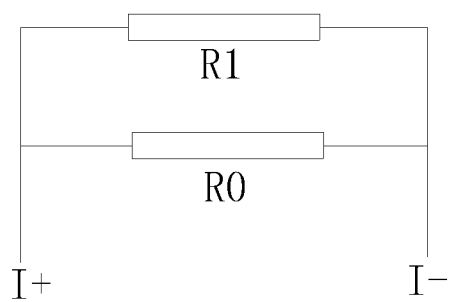
FIG. 9 is a schematic view of a pressure measuring circuit applied in a pressure sensor according to a third embodiment of the present invention.

Please refer to FIG. 9, the pressure sensor 100 provided by the third embodiment of the present application is substantially the same as the pressure sensor 100 provided by the first embodiment, unlike the first embodiment, a pressure measuring circuit has two resistors, and the measuring circuit is a parallel circuit circuit formed by a strain sensing resistor R1 in parallel with a reference resistor R0.

Using a constant current source, inflicting input current I on both ends of I+ and I−, measuring the output current I1 on the R1 branch, and there are input and output current formulas:

$$I_1 = \frac{R_0}{R_1 + R_0} I$$

When the strain sensing resistor R1 is deformed, its electrical characteristics will correspondingly change, and consequently the pressure measuring circuit obtains the output current I1. Through the pressure sensing detection circuit, the corresponding electrical signal output is obtained, and pressure recognition and detection are realized.

It can be understood that a pressure measuring circuit has two resistors, and the pressure measuring circuit is a parallel circuit circuit formed by two strain sensing resistors connected in parallel. The scheme can also obtain the corresponding electrical signal output through the pressure sensing detection circuit to realize pressure identification and detection.

Figure 10:
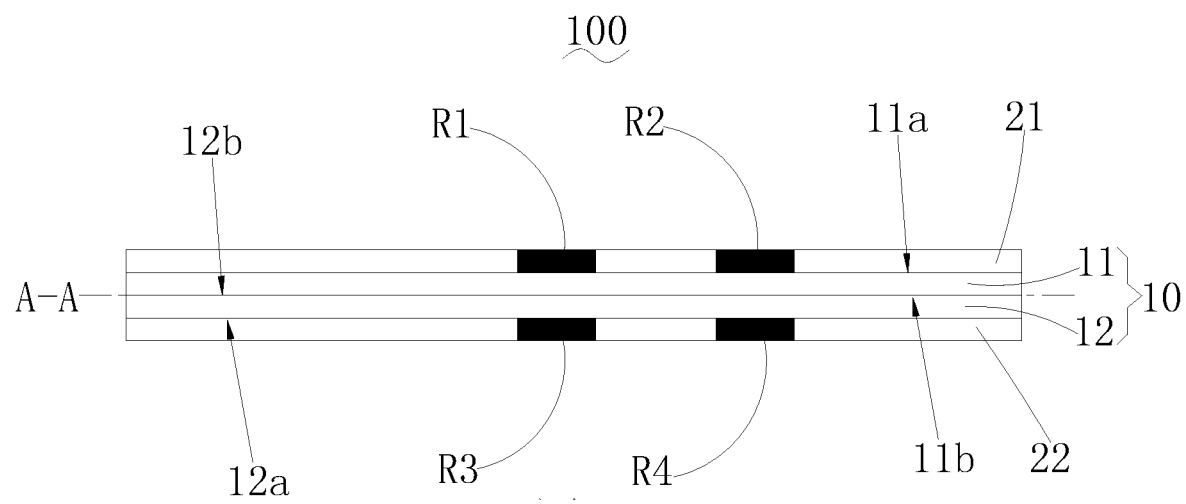
FIG. 10 is a front view of a pressure sensor according to a fourth embodiment of the present invention.
Figure 11:
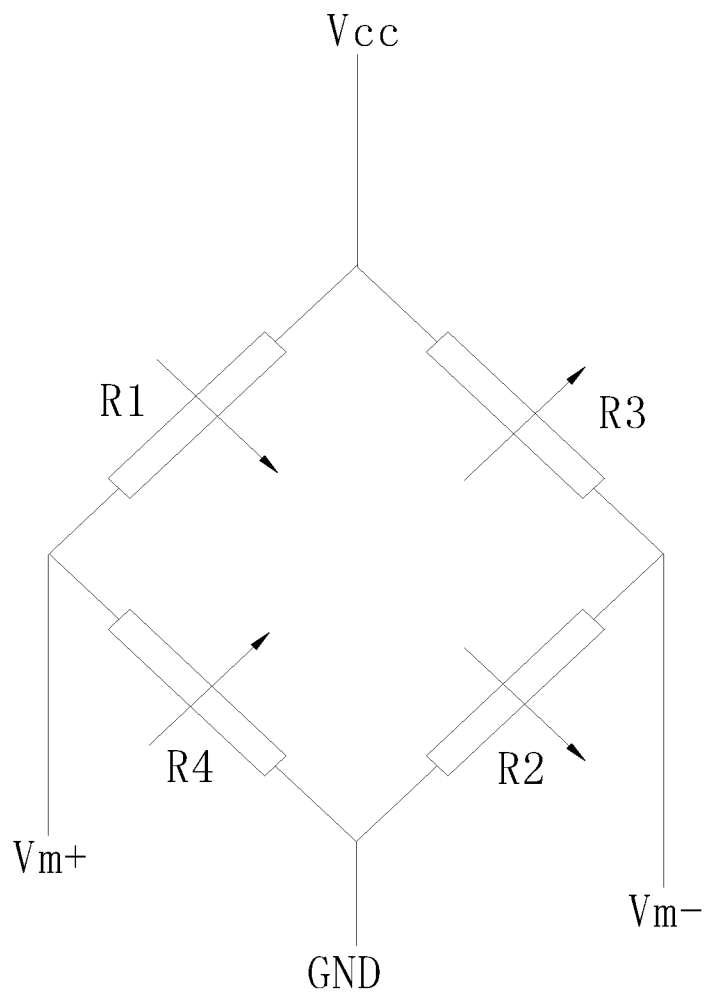
FIG. 11 is a schematic view of a pressure measuring circuit applied to the pressure sensor of FIG. 10.

Please refer to FIG. 10 to FIG. 12, the pressure sensor 100 provided by the third embodiment of the present application is substantially the same as the pressure sensor 100 provided by the first embodiment, unlike the first embodiment, a pressure measuring circuit has four resistors. The pressure measuring circuit is a full bridge formed by electrically connecting four strain sensing resistors R1, R2, R3, and R4. The two strain sensing resistors R1 and R2 are disposed on the first mounting surface 11a, and the two strain sensing resistors R3 and R4 are disposed on the second mounting surface 12a.

The two strain sensing resistors R1 and R2 and two strain sensing resistors R3 and R4 disposed on two sides of the substrate component 10 respectively form a bridge circuit, and the pressure sensor 100 is connected to the required panel 200, and curved variable of the panel 200 can be detected. When the panel 200 is pressed, the panel 200 will generate a deflection deformation, which causing the pressure sensor 100 to generate a corresponding deformation. The substrate component 10 has a certain thickness, at the center line A-A of the substrate component 10, the size length of the substrate component 10 does not change after the substrate component 10 is bent and deformed, on a surface of the substrate component 10 which coincides with the bending direction, the substrate component 10 becomes large in size length, while the surface of the substrate component 10 facing away from the bending direction becomes smaller in size length. The resistors on both sides of the substrate component 10 are deformed differently, which causing changes or changes in different level of electrical characteristics, and then the corresponding electrical signal output is obtained through the pressure sensing detection circuit.

Specifically, the strain sensing resistors R1 and R2 and the strain sensing resistors R3 and R4 are molded on a printed circuit layer of the substrate component 10, and the circuit layer is used to connect the strain sensing resistors.

In the bridge circuit composed of strain sensing resistors R1 and R2 and strain sensing resistors R3 and R4, inputting a voltage Ui, and an output voltage Uo is obtained at both ends of Vm+ and Vm−, and there are an input and output voltage formulas:

$$U_o = \frac{R_1 R_2 - R_3 R_4}{(R_1 + R_4)(R_2 + R_3)} U_i$$

Since the resistance of the strain sensing resistor changes according to the deformation, it is necessary to obtain two sets different deformations of resistance values, and the strain sensing resistors R1 and R2 and the strain sensing resistors R3 and R4 must be deformed differently. The pressure sensor 100 is placed behind the panel 200 (such as a mobile phone screen), when the panel 200 is pressed, the strain sensing resistor will be deformed according to the deformation of the panel 200, and where the spatial position of the panel 200 is similar, the shape variable is also similar, so the strain sensing resistors R1 and R2 and the strain sensing resistors R3 and R4 need to be differently deformed and must be placed far apart.

Strain sensing resistors are sensitive to temperature, and changes in temperature will cause changes in resistance. In electronic devices (such as mobile phones), there are different devices in different areas under the screen, and some places have batteries, chips, etc. These devices will be heated during used, which causing large temperature differences in different areas; at the same time, the heating of the screen is uneven, it will also cause a large difference in temperature between different areas. In this way, the two sets of strain sensing resistors distributed farther away will have different resistance values due to the difference in temperature. Such a phenomenon will interfere with the pressure deformation and cause the resistance value to change, and become a serious disturbance factor affecting pressure sensing.

The strain sensing resistors R1 and R2 are disposed on the first mounting surface 11a, and the strain sensing resistors R3 and R4 are disposed on the second mounting surface 12a, the relative positions of the strains on the two sides relative to the bridge may coincide, or may be placed in a similar with a certain misalignment position. Connecting the pressure sensor 100 to the desired panel 200 can detect the curved deformation amount of the panel 200. When the panel 200 is pressed, the panel 200 will generate a deflection deformation, which causing the pressure sensor 100 to generate a corresponding deformation. The R1, R2 and R3, R4 located on both sides of the substrate component 10 will generate different deformations, which resulting in different changes in resistance, so that a voltage change will be generated through the bridge circuit, thereby obtaining an output voltage $U_o$ as an output signal.

At the same time, in this way, the two sets strain sensing resistors of the bridge can be in close proximity, at close positions, the temperature changes are similar, the two sets of strain sensing resistors will simultaneously heat up or simultaneously cool down, and the resistance value will increase at the same time, or it will decrease at the same time without affecting the change of voltage difference. Therefore, such a design not only ensures that the two sets of strain sensing resistors in the bridge have different deformation variables, but also ensures that the temperature change has little influence on the deformation variables, thereby solving the problem of temperature interference.

It can be understood that a pressure measuring circuit has four resistors, and the pressure measuring circuit is a Wheatstone bridge formed by electrically connecting a strain sensing resistor R1 and three reference resistors R0; or a pressure measuring circuit has four resistors, the pressure measuring circuit is a half bridge formed by electrically connecting two strain sensing resistors and two reference resistors R0. Preferably, when the pressure measuring circuit is a half bridge, one of the strain sensing resistors is located on the first mounting surface 11a, and the other strain sensing resistor is located on the second mounting surface 12a. Alternatively, a pressure measuring circuit has four resistors, and the pressure measuring circuit is a bridge circuit formed by electrically connecting three strain sensing resistors to one reference resistor R0. The above schemes are capable of generating a measurement signal following the deflection deformation of the panel 200 when pressure is applied to the panel 200, and measuring the amount of deflection deformation of the panel 200.

Further, in a pressure measuring circuit, the two resistors coincide with the other two resistors in the thickness direction of the substrate component 10; or, in a pressure measuring circuit, four resistors are staggered distributed. The above scheme can connect the pressure sensor 100 to the curved deformation amount variable of the detection panel 200 on the desired panel 200.

Figure 3:
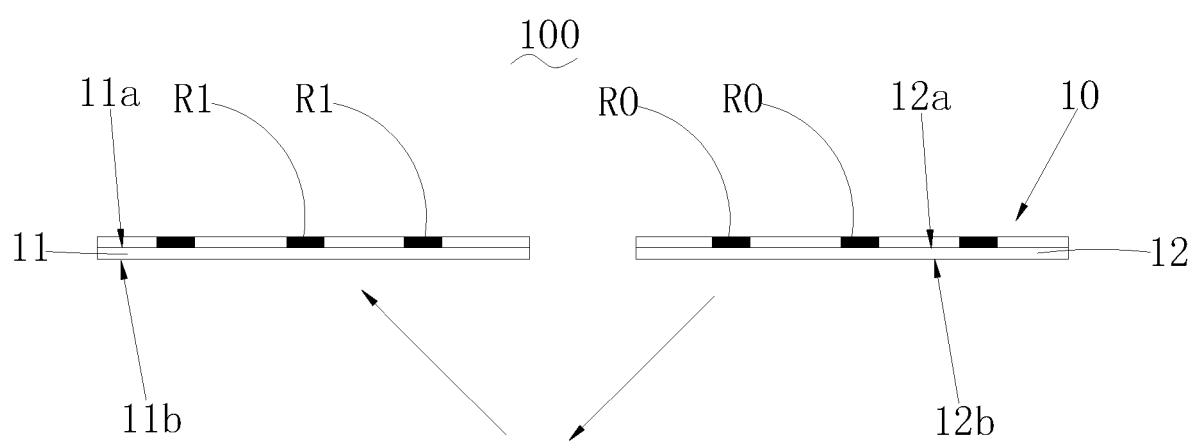
FIG. 3 is an exploded view of the pressure sensor of FIG. 1.
Figure 4:
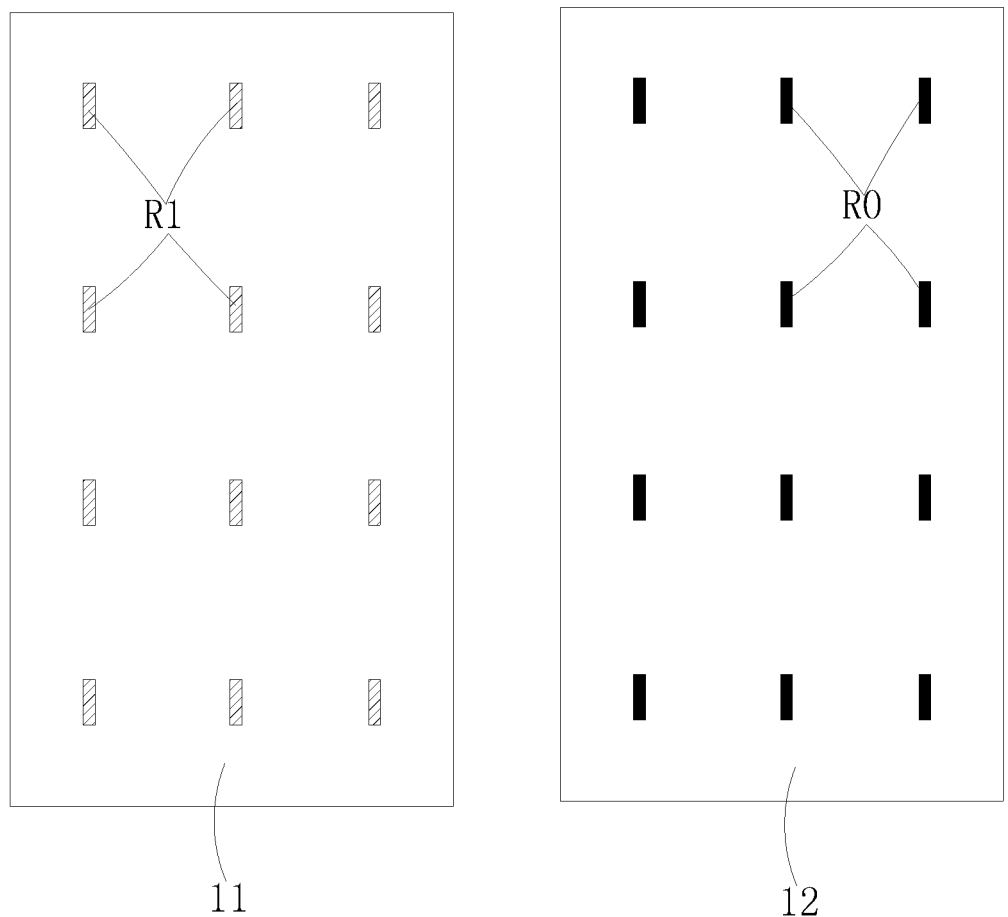
FIG. 4 is an exploded view of another angle of the pressure sensor of FIG. 3.

It can be understood that when the substrate assembly 10 is a split structure as shown in FIG. 3 or an integrally formed structure as shown in FIG. 7, the pressure measuring circuit can adopt a bleeder voltage, a parallel circuit circuit, a Wheatstone bridge, a half bridge, and a full bridge. Or any one of the other bridge circuits. Alternatively, the pressure measuring circuit can be other existing pressure measuring circuits.

Please refer to FIG. 12, an electronic device according to a first embodiment of the present application comprises a panel 200, a pressure sensor 100, and a pressure sensing detection circuit electrically connected to the pressure sensor 100, the substrate component 10 is connected to the inner side of the panel 200.

The pressure sensor 100 is in the form of a film or a plate, and the pressure sensor 100 is laminated with the panel 200, which is compact and easy to install.

Specifically, the pressure sensing detection circuit analyzes the electrical signal of the pressure sensor 100 and together with the touch position information detected by the panel 200 are transmitting to the main controller of the electronic device. Thereby achieving an accurate pressure to obtain a touch while recognizing the touch position, which is prior art.

The panel 200 can be a touch screen, display, or other electronic device having a rigid structure. By connecting the pressure sensor 100 to the panel 200, it is possible to accurately recognize the touch pressure while accurately recognizing the touch position, thereby expanding the application space for the electronic device in product application, human-computer interaction and consumption experience. Users can directly obtain accurate pressure levels and quantities by touching the touch screen, display or electronic device. After the correction, the exact pressure value of the press can be obtained.

Specifically, the panel 200 may be a glass plate having a thickness of 1.1 mm, and the glass plate itself is designed with a function of a touch screen; or, the panel 200 may be a LCD liquid crystal display or an OLED display having a thickness of 1.6 mm; or the panel 200 may be an electronic components having a touch function and display function.

The pressure sensing detection circuit is used for detecting an electrical signal obtained by the pressure sensor 100, and processing and analyzing the electrical signal. The pressure sensor 100 is connected to the pressure sensing detecting circuit through a connecting line. The connecting line is merely a description of the combination of the pressure sensor 100 and the pressure sensing detecting circuit. As other embodiments, the pressure sensor 100 can be directly or indirectly electrically connected with the pressure sensing detecting circuit by other methods.

Further, the substrate component 10 and the panel 200 are bonded by a adhesive 300. This configuration is easy to assemble, and the substrate component 10 is firmly connected to the panel 200 and can also transmit deformation. The adhesive 300 may be a double-sided glue, a VHB acrylic Styrofoam, AB glue, epoxy resin or the like. The material selection and thickness of these glue materials are determined according to the materials of the substrate component 10 and the panel 200.

Further, the substrate component 10 and the panel 200 are fully connected to each other. The scheme can cause the panel 200 to generate a deflection deformation when the panel 200 is pressed, so that the pressure sensor 100 also generates a corresponding deformation, and the pressure sensor 100 converts the deformation into an electrical signal, and outputs the pressure value at this time.

Please refer to FIG. 10, the electronic device according to a second embodiment of the present application is substantially the same as the electronic device provided in the first embodiment, unlike the first embodiment, the substrate component 10 is connected to the periphery of the panel 200. The scheme can cause the panel 200 to generate a deflection deformation when the panel 200 is pressed, so that the pressure sensor 100 also generates a corresponding deformation, and the pressure sensor 100 converts the deformation into an electrical signal, and outputs the pressure value at this time. Specifically, at least two constraint bits are disposed between the substrate component 10 and the panel 200. The substrate component 10 and the panel 200 are bonded by an adhesive 300.

Please refer to FIGS. 1 to 4, the present application is provided a method for manufacturing a pressure sensor according to a first embodiment, comprising the steps:

S11) providing the first substrate 11 and the second substrate 12;

S12) simultaneously molding at least two resistors by using the same process at the first mounting surface 11a and the second mounting surface 12a, wherein one of the resistor is located on the first mounting surface 11a, and the other resistor is located on the second mounting surface 12a, and at least one of the resistors is a strain sensing resistor R1 for detecting a deflection deformation of the substrate component 10;

S13) bonding the first bonding surface 11b to the second bonding surface 12b;

S14) electrically connecting the resistors to form a pressure measuring circuit.

At least two resistors are simultaneously molded at the first mounting surface 11a and the second mounting surface 12a of the substrate component 10 ensuring uniformity and consistency of resistance of all resistors, at least one of resistors is a strain sensing resistor, and the resistors are electrically connected to form a pressure measuring circuit. Connecting the pressure sensor 100 to the desired panel 200 to accurately detect the curved deformation amount of the panel 200. When the panel 200 is pressed, the panel 200 will generate a deflection deformation, causing the pressure sensor 100 to generate a corresponding deformation. The strain sensing resistor R1 is deformed, causing a change in electrical characteristics, and then the corresponding electrical signal output is obtained through the pressure sensing detection circuit. The resistors in a pressure measuring circuit are adjacently distributed, and the resistance value of the resistor changes with temperature at the same time, so that the influence of the temperature change on the pressure measuring circuit is very small, and the interference against the external environment is good. The pressure sensor 100 is easy to manufacture and assemble, the process is simple, can realize pressure recognition and detection, the sensitivity is high, and avoiding the requirement that the existing pressure sensor assembly method is extremely high, the pressure detection precision is low, and the manufacture cost is high.

Further, the first substrate 11 comprises a first base board and a first circuit layer disposed on the first base board. The second substrate 12 comprises a second base board and a second circuit layer disposed on the second base board, a perforation for disposing an electrical conductor electrically connecting the first circuit layer and the second circuit layer is disposed on the first substrate or the second substrate. The perforation is formed in the first substrate or the second substrate, and the two circuit layers are connected by providing a conductive paste, a silver paste, a conductive printed layer or the like in the perforation.

Further, using print molded resistor simultaneously;

alternatively, using coating molded resistor simultaneously;

alternatively, using printed molded polymer coating having a pressure-sensitive property to form a resistor;

alternatively, using sintered molded piezoelectric ceramic coating to form a resistor.

All of the above resistors can change the resistance according to the deformation or as a reference resistor.

Further, a strain sensing resistor R1 is connected in series with a reference resistor R0 to form a series circuit as a pressure measuring circuit;

alternatively, two strain sensing resistors are connected in series to form a series circuit as a pressure measuring circuit;

alternatively, a strain sensing resistor R1 is connected in parallel with a reference resistor R0 to form a parallel circuit circuit as a pressure measuring circuit;

alternatively, two strain sensing resistors are connected in parallel to form a parallel circuit circuit as a pressure measuring circuit;

alternatively, a strain sensing resistor R1 is electrically connected to three reference resistors R0 to form a Wheatstone bridge as a pressure measuring circuit;

alternatively, two strain sensing resistors are electrically connected to two reference resistors R0 to form a half bridge as a pressure measuring circuit;

alternatively, the four strain sensing resistors R1, R2, R3, and R4 are electrically connected to form a full bridge as a pressure measuring circuit;

alternatively, three strain sensing resistors are electrically connected to a reference resistor to form a bridge circuit as a pressure measuring circuit.

The above schemes are capable of generating a measurement signal following the deflection deformation of the panel 200 when pressure is applied to the panel 200, and measuring the amount of deflection deformation of the panel 200. For details, refer to the pressure sensors provided by the second to fourth embodiments of the present application.

Please refer to FIGS. 6 to 8, the present application is provided a method for manufacturing a pressure sensor according to a second embodiment, comprising the steps:

S21) providing the substrate component 10;

S22) simultaneously molding at least two resistors by using the same process at the first mounting surface 11a and the second mounting surface 12a to ensure that at least one of the resistors is located on the first mounting surface 11a, and the other resistor is located on the second mounting surface 12a, and at least one of the resistors is a strain sensing resistor R1 for detecting a deflection deformation of the substrate component 10;

S23) bonding the first bonding surface 11b to the second bonding surface 12b;

S24) electrically connecting the resistors to form a pressure measuring circuit.

At least two resistors are simultaneously molded at the first mounting surface 11a and the second mounting surface 12a of the substrate component 10 ensuring uniformity and consistency of resistance of all resistors, at least one of resistors is a strain sensing resistor, and the resistors are electrically connected to form a pressure measuring circuit. Connecting the pressure sensor 100 to the desired panel 200 to accurately detect the curved deformation amount of the panel 200. When the panel 200 is pressed, the panel 200 will generate a deflection deformation, causing the pressure sensor 100 to generate a corresponding deformation. The strain sensing resistor R1 is deformed, causing a change in electrical characteristics, and then the corresponding electrical signal output is obtained through the pressure sensing detection circuit. The resistors in a pressure measuring circuit are adjacently distributed, and the resistance value of the resistor changes with temperature at the same time, so that the influence of the temperature change on the pressure measuring circuit is very small, and the interference against the external environment is good. The pressure sensor 100 is easy to manufacture and assemble, the process is simple, can realize pressure recognition and detection, the sensitivity is high, and avoiding the requirement that the existing pressure sensor assembly method is extremely high, the pressure detection precision is low, and the manufacture cost is high.

The aforementioned embodiments are only preferred embodiments of the present application, and are not intended to limit the present application. Any modification, equivalent replacement, improvement, and so on, which are made within the spirit and the principle of the present application, should be included in the scope of the present application. Therefore, the scope of the present application is subject to the scope of the claims.

What is claimed is:

1. A pressure sensor, comprising:
a substrate component comprising a first mounting surface and a second mounting surface facing away from the first mounting surface, wherein the substrate component includes a first substrate and a second substrate, the first substrate having a first bonding surface, the second substrate having a second bonding surface, and the first bonding surface being bonded to the second bonding surface; and
at least one pressure measuring circuit comprising at least two resistors simultaneously molded on the substrate component, at least a first of the at least two resistors located on the first mounting surface, at least a second of the at least two resistors located on the second mounting surface, at least one of the at least two resistors comprising a strain sensing resistor for detecting deflection deformation of the substrate component, wherein the at least two resistors in the pressure measuring circuit are adjacently distributed.

2. The pressure sensor of claim 1, wherein the first mounting surface comprises a side surface of the first substrate, and the first bonding surface faces away from the first mounting surface, the second mounting surface comprising a side surface of the second substrate, and the second bonding surface faces away from the second mounting surface.

3. A pressure sensor, comprising:
a substrate component comprising a first mounting surface and a second mounting surface disposed away from each other; and
at least one pressure measuring circuit comprising at least two resistors simultaneously molded on the substrate component, wherein at least one of the resistors is located on the first mounting surface, the other one of the resistors is located on the second mounting surface, and at least one of the resistors is a strain sensing resistor for detecting deflection deformation of the substrate component, the resistors in the pressure measuring circuit being adjacently distributed,
wherein the substrate component includes a first substrate and a second substrate, the first mounting surface is a side surface of the first substrate, and the first substrate has a first bonding surface facing away from the first mounting surface, the second mounting surface is a side surface of the second substrate, and the second substrate has a second bonding surface facing away from the second mounting surface, the first bonding surface and the second bonding surface are attached to each other, wherein the first substrate and the second substrate are integrally formed, a side of the first substrate is connected to a side of the second substrate, and a broken line is formed at a joint of the first substrate and the second substrate.

4. The pressure sensor according to claim 1, wherein the at least one pressure measuring circuit comprises at least two pressure measuring circuits distributed in an array on the substrate component.

5. The pressure sensor according to claim 1, wherein the at least one pressure measuring circuit has two resistors, and the pressure measuring circuit comprises one of the following:
 a series circuit formed by a strain sensing resistor and a reference resistor connected in series,
 a series circuit formed by two strain sensing resistors connected in series,
 a parallel circuit formed by a strain sensing resistor and a reference resistor connected in parallel, or
 a parallel circuit formed by two strain sensing resistors connected in parallel.

6. The pressure sensor according to claim 1, wherein the at least one pressure measuring circuit comprises four resistors connected as:
 a Wheatstone bridge formed by electrically connecting a strain sensing resistor and three reference resistors, or
 a half bridge formed by electrically connecting two strain sensing resistors and two reference resistors, or
 a full bridge formed by electrically connecting four strain sensing resistors, or
 a bridge circuit formed by electrically connecting three strain sensing resistors and one reference resistor.

7. A pressure sensor, comprising:
 a substrate component comprising a first mounting surface and a second mounting surface disposed away from each other; and
 at least one pressure measuring circuit comprising at least two resistors simultaneously molded on the substrate component, wherein at least one of the resistors is located on the first mounting surface, the other one of the resistors is located on the second mounting surface, and at least one of the resistors is a strain sensing resistor for detecting deflection deformation of the substrate component, the resistors in the pressure measuring circuit being adjacently distributed,
 wherein the at least one pressure measuring circuit comprises four resistors connected as:
  a Wheatstone bridge formed by electrically connecting a strain sensing resistor and three reference resistors, or
  a half bridge formed by electrically connecting two strain sensing resistors and two reference resistors, or
  a full bridge formed by electrically connecting four strain sensing resistors, or
  a bridge circuit formed by electrically connecting three strain sensing resistors and one reference resistor,
 wherein the at least two resistors coincide with two other of the four resistors in a thickness direction of the substrate component, or the four resistors have a staggered distribution.

8. A pressure sensor, comprising:
 a substrate component comprising a first mounting surface and a second mounting surface disposed away from each other; and
 at least one pressure measuring circuit comprising at least two resistors simultaneously molded on the substrate component, wherein at least one of the resistors is located on the first mounting surface, the other one of the resistors is located on the second mounting surface, and at least one of the resistors is a strain sensing resistor for detecting deflection deformation of the substrate component, the resistors in the pressure measuring circuit being adjacently distributed,
 wherein the substrate component includes a first substrate and a second substrate, the first mounting surface comprises a side surface of the first substrate, and the first substrate has a first bonding surface facing away from the first mounting surface, the second mounting surface comprising a side surface of the second substrate, and the second substrate has a second bonding surface facing away from the second mounting surface, the first bonding surface and the second bonding surface being attached to each other,
 wherein the first substrate comprises a first base board and a first circuit layer disposed on the first base board, and the second substrate comprises a second base board and a second circuit layer disposed on the second base board.

9. The pressure sensor of claim 8, wherein a perforation for disposing an electrical conductor electrically connecting the first circuit layer and the second circuit layer is disposed on the first substrate or the second substrate.

10. The pressure sensor of claim 8, wherein the first base board comprises a PI film, a PET film or a glass fiber board, and the second base board comprises a PI film, a PET film or a glass fiber board.

11. The pressure sensor of claim 1, wherein the at least two resistors comprise print molded resistors, coated molded resistors, print molded polymer coatings, having a pressure-sensitive property, or sintered molded piezoelectric ceramic coatings.

12. An electrical device comprising the pressure sensor according to claim 1 and a pressure sensing detection circuit electrically connected to the pressure sensor, wherein the substrate component is connected to an inner side of a panel.

13. An electrical device comprising a pressure sensor and a pressure sensing detection circuit electrically connected to the pressure sensor, the pressure sensor comprising:
 a substrate component comprising a first mounting surface and a second mounting surface disposed away from each other; and
 at least one pressure measuring circuit comprising at least two resistors simultaneously molded on the substrate component, wherein at least one of the resistors is located on the first mounting surface, the other one of the resistors is located on the second mounting surface, and at least one of the resistors is a strain sensing resistor for detecting deflection deformation of the substrate component, the resistors in the pressure measuring circuit being adjacently distributed,
 wherein the substrate component is connected to an inner side of a panel,
 wherein the substrate component and the panel are bonded by an adhesive.

14. An electrical device comprising a pressure sensor and a pressure sensing detection circuit electrically connected to the pressure sensor, the pressure sensor comprising:

a substrate component comprising a first mounting surface and a second mounting surface disposed away from each other; and at least one pressure measuring circuit comprising at least two resistors simultaneously molded on the substrate component, wherein at least one of the resistors is located on the first mounting surface, the other one of the resistors is located on the second mounting surface, and at least one of the resistors is a strain sensing resistor for detecting deflection deformation of the substrate component, the resistors in the pressure measuring circuit being adjacently distributed, wherein the substrate component is connected to an inner side of a panel, wherein the substrate component and the panel are fully connected to each other, or the substrate component is connected to the periphery of the panel.

15. A method for manufacturing a pressure sensor, comprising:

providing a substrate component having a first mounting surface and a second mounting surface facing away from the first mounting surface, the substrate component including a first substrate and a second substrate, the first substrate having a first bonding surface, and the second substrate having a second bonding surface;

using the same process, simultaneously molding a first resistor at the first mounting surface and a second resistor at the second mounting surface to ensure that at least one of the first and second resistors is located on the first mounting surface, and the other one of the first and second resistors is located on the second mounting surface to thereby cancel temperature interference, and at least one of the first and second resistors is a strain sensing resistor for detecting deflection deformation of the substrate component;

bonding the first bonding surface to the second bonding surface; and electrically connecting the first and second resistors to form a pressure measuring circuit.

16. The method of claim 15, wherein the first substrate comprises a first base board and a first circuit layer disposed on the first base board, the second substrate comprises a second base board and a second circuit layer disposed on the second base board, and a perforation for disposing an electrical conductor electrically connecting the first circuit layer and the second circuit layer is disposed on the first substrate or the second substrate, the first substrate or the second substrate being electrically connected by disposing the electrical conductor at the perforation.

17. The method according to claim 15, wherein one of the at least first and second resistors is formed by using a print molded resistor simultaneously, using a coating molded resistor simultaneously, using a printed molded polymer coating having a pressure-sensitive property, or using a sintered molded piezoelectric ceramic coating.

18. The method according to claim 15, wherein electrically connecting comprises one of:

forming a series circuit by electrically connecting a strain sensing resistor in series with a reference resistor, forming a series circuit by electrically connecting two strain sensing resistors in series, forming a parallel circuit by electrically connecting a strain sensing resistor in parallel with a reference resistor, forming a parallel circuit by electrically connecting two strain sensing resistors in parallel, forming a Wheatstone bridge by electrically connecting a strain sensing resistor to three reference resistors, forming a half bridge by electrically connecting two strain sensing resistors to two reference resistors, forming a full bridge by electrically connecting the four strain sensing resistors, or forming a bridge circuit by electrically connecting three strain sensing resistors to a reference resistor.

19. The pressure sensor of claim 1 wherein the first and second resistors are located in close proximity to one another on different surfaces thereby providing different deformation variables that are substantially independent of temperature change.

20. The method of claim 15 further including folding the substrate component to locate the first and second resistors in proximity to one another.

* * * * *